(12) United States Patent
Kwan

(10) Patent No.: US 6,235,829 B1
(45) Date of Patent: *May 22, 2001

(54) MODIFICATION OF CHARGEABLE PIGMENT PARTICLES

(75) Inventor: Wing Sum Vincent Kwan, Deerfield, IL (US)

(73) Assignee: Marconi Data Systems Inc., Wood Dale, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,164

(22) Filed: Jul. 24, 1998

(51) Int. Cl.$^7$ .................................................. C08K 3/03
(52) U.S. Cl. ................................... 524/495; 523/210
(58) Field of Search .............................. 524/495; 523/210

(56) References Cited

U.S. PATENT DOCUMENTS

| | | |
|---|---|---|
| 3,348,959 | 10/1967 | Csonka et al. . |
| 3,398,113 | 8/1968 | Godshalk et al. . |
| 3,453,130 | 7/1969 | Feld . |
| 3,956,179 | 5/1976 | Sebastian et al. . |
| 4,160,760 | 7/1979 | Carr et al. . |
| 4,277,288 | 7/1981 | Lawrence et al. . |
| 4,327,011 | 4/1982 | Ripley et al. . |
| 4,545,821 | 10/1985 | Rau et al. . |
| 4,755,563 | 7/1988 | West . |
| 4,913,063 | 4/1990 | Jonas et al. . |
| 5,420,317 | 5/1995 | Laufenberg et al. . |
| 5,428,099 * | 6/1995 | Morrar et al. ............ 524/495 |
| 5,482,809 | 1/1996 | Rao et al. . |
| 5,501,732 | 3/1996 | Niedenzu et al. . |
| 5,521,046 | 5/1996 | Materazzi . |
| 5,521,271 | 5/1996 | Smith et al. . |
| 5,536,615 | 7/1996 | Hopper et al. . |
| 5,558,968 | 9/1996 | Russell et al. . |
| 5,563,024 | 10/1996 | Bohan et al. . |

FOREIGN PATENT DOCUMENTS

| | | |
|---|---|---|
| 2048183 | 2/1992 | (CA) . |
| 643875 | 6/1984 | (CH) . |
| 2 043 629 | 3/1972 | (DE) . |
| 379122 | 7/1990 | (EP) . |
| 504066 | 9/1992 | (EP) . |
| 596465 | 5/1994 | (EP) . |
| 0 707 051 | 4/1996 | (EP) . |
| 0787777 * | 8/1997 | (EP) . |
| 2 281 410 | 3/1976 | (FR) . |
| 1104939 | 3/1968 | (GB) . |
| 1 287 576 | 8/1972 | (GB) . |
| 1 460 315 | 1/1977 | (GB) . |
| 1 494 746 | 12/1977 | (GB) . |
| 1 514 922 | 6/1978 | (GB) . |
| 51-082317 | 7/1976 | (JP) . |
| 59-170130 | 9/1984 | (JP) . |
| 59-170131 | 9/1984 | (JP) . |
| 60-079068 | 5/1985 | (JP) . |
| 62-267368 | 5/1986 | (JP) . |
| 6115945 | 4/1994 | (JP) . |
| 07053910 | 2/1995 | (JP) . |
| 07165986 | 6/1995 | (JP) . |
| 8109022 | 4/1996 | (JP) . |
| WO 87/05924 | 10/1987 | (WO) . |

OTHER PUBLICATIONS

PCT Search Report, Dec. 10, 1996, (GB 96/02415).
Hawley's Condensed Chemical Dictionary, 11$^{th}$ Ed. pp. 695 and 838.
Schofield, Hyperdispersants, J.D. Surface Coating Institute (*JOCCA*) 74(6) pp. 204, 206–10 (1991).
Hays, B.G., A Model For Organic Pigments In Oil Or Water Based Printing Inks, *Am. Ink Maker*, vol. 64, pp. 13–21 (1996).
Y. Hirobe et al., *IS & T's Eighth Int'l Congress on Advances in Non–Impact Printing Technologies*, pp. 198–200 (1992).

* cited by examiner

Primary Examiner—Edward J. Cain
(74) Attorney, Agent, or Firm—Leydig, Voit & Mayer, Ltd.

(57) ABSTRACT

The present invention provides a method for making a non-polar suspension of chargeable pigment particles. A suspension of pigment particles is formed in a non-polar solvent, wherein the pigment particles are inherently ionic or are chargeable, and possess surface anchoring groups on the surface of the pigment particles. The pigment particles are contacted with a polymeric resin comprising a hydrophobic region that is soluble or solvatable in the non-polar solvent and a reactive group that reacts with the surface-anchoring groups on the surface of the pigment particle. The resultant coated pigment particles are stable in non-polar suspensions. In certain embodiments of the present invention, a covalent bond is formed between the pigment and the surface modifying polymer.

22 Claims, No Drawings

MODIFICATION OF CHARGEABLE PIGMENT PARTICLES

FIELD OF THE INVENTION

The present invention relates to hydrophobic modification of chargeable pigment particles and non-polar suspensions of such pigment particles.

BACKGROUND OF THE INVENTION

Stable suspensions of chargeable pigment particles are desirable in certain applications wherein the formation of images (permanent or latent) requires charging or discharging the pigment particles. Such applications include liquid toners, ink jet inks using solvents and electrostatic paints.

The preparation of such suspensions has been documented in literature. To stabilize hydrophilic pigments in non-polar solvents, steric barriers are introduced to provide stabilization. Common strategies to do so include the use of ionic surfactants or polymeric dispersants which adsorb on the pigment (e.g., U.S. Pat. Nos. 5,536,615 and 5,482,809); dendrimers (e.g., U.S. Pat. No. 5,558,968) or non-polymeric resins (e.g., U.S. Pat. No. 5,521,046) to modify the pigment surface. Though polymeric dyes (U.S. Pat. Nos. 5,521,271 and 5,563,024) have been disclosed as alternatives to pigments for use in such applications, their inferior lightfastness and weatherability, coupled with their relatively high production costs, have restricted their usage.

Stable suspensions of chargeable pigment particles in non-polar solvents is difficult to prepare, mainly for two reasons. First, many chargeable pigment particles contain surface polar functional groups like carboxylic acid. In addition to rendering the pigment chargeable, these polar functional groups also make the pigment hydrophilic. In non-polar systems containing non-polar solvents, the hydrophilicity of the pigment particles causes them to be attracted to each other rather than to the non-polar solvent, resulting in flocculation and destabilization of the pigment suspension.

Second, in contrast to the possibility of applying both steric and electrostatic interactions to combat flocculation in polar systems, mainly steric interaction can be applied in non-polar systems. In most cases, surfactants are used to provide steric stabilization in suspending such particles. The polar ends of the surfactants adsorb onto the hydrophilic pigment surface, and the hydrophobic portion is solvated by the non-polar solvent. This mode of weak attachment leads to flocculation and degradation of the non-polar suspension. A disadvantage of using physically adsorbed surfactants or dispersants in suspensions is that under external stress, like a high electric field, some of these suspensions or formulations become unstable. This is due to the dissociation or desorption of a surfactant or resin from the pigment particle surface.

The use of dendrimers that are covalently bonded to pigment surfaces partially addresses the problem of desorption, but the process of assembling such a complex molecular architecture on the pigment surface translates into a lengthy preparation and high production cost.

A need therefore exists for a method of making a non-polar suspension of chargeable pigment particles that does not suffer from problems such as desorption, and is available as a lower cost alternative to the use of dendrimers and the like.

SUMMARY OF THE INVENTION

The foregoing needs have been fulfilled to a great extent by the present invention which provides a method for making a non-polar suspension of chargeable pigment particles comprising (1) forming a suspension of pigment particles in a non-polar solvent, wherein the pigment particles are inherently ionic or are chargeable and possess surface anchoring groups on the surface of the pigment particles; and (2) contacting the pigment particles with a polymeric resin comprising a hydrophobic region and a reactive group that reacts with the surface-anchoring groups on the surface of the pigment particle. Preferably, the reactive groups form a covalent bond between the pigment and the polymeric resin.

The present invention further provides a non-polar suspension of inherently ionic or chargeable pigment particles having surface-anchoring groups on the surface of the particles. The suspension comprises the pigment particles suspended in a non-polar solvent, wherein the pigment particles have on their surface a polymeric resin that comprises a hydrophobic region and a reactive group that reacts with the surface-anchoring groups on the pigment surface.

The present invention further provides a method of hydrophobically modifying chargeable pigment particles having a first functional group, the method comprising contacting the pigment particles with a polymer having a hydrophobic region and a second functional group in such a way as to form a covalent bond between the first and second functional groups.

DETAILED DESCRIPTION OF THE PREFERRED EMBODIMENTS

The present invention provides a method for making a non-polar suspension of chargeable pigment particles comprising (1) forming a suspension of pigment particles in a non-polar solvent, wherein the pigment particles are inherently ionic or are chargeable and possess surface anchoring groups on the surface of the pigment particles; and (2) contacting the pigment particles with a polymeric resin comprising a hydrophobic region and a reactive group that reacts with the surface-anchoring groups on the surface of the pigment particle. The surface anchoring group and the polymeric resin can form a covalent or hydrogen bonding, preferably a covalent bond. The polymeric resin preferably comprises a maleic anhydride group.

The present invention also provides a non-polar suspension of inherently ionic or chargeable pigment particles having surface-anchoring groups on the surface of the particles. The suspension comprises the pigment particles suspended in a non-polar solvent, wherein the pigment particles have on their surface a polymeric resin that comprises a hydrophobic region and a reactive group that reacts with the surface-anchoring groups on the pigment surface.

The pigment particles for modification according to the present invention advantageously have two desirable properties: chargeability and susceptibility to being modified. Chargeability is imparted by the reactive or functional groups present on the pigment. Thus, chargeable pigments can be divided into two categories. The first category includes pigments that are inherently ionic in character. Examples of this type of pigment include complexes of transitional metals, e.g., iron blue; and ionic compounds, e.g., calcium sulfate. Some pigments contain residual ionic species on their surface, as a result of an inefficient washing process. Although such pigments may be used in the present process, since the ionic species on the pigment surface are not bound tightly on the surface, they may be lost or washed off during the process steps, and hence chargeability of such pigments may not be satisfactory and may vary from batch to batch.

The second category of chargeable pigments includes pigments that are not inherently ionic and yet possess chargeable groups on the surface. These groups include, but are not limited to, carboxylic groups, hydroxyl groups including phenolic hydroxyl groups, alkyl hydroxyl groups, and alkenyl hydroxyl groups, amino groups which may be primary, secondary, tertiary or quaternary ammonium groups, quinoline groups, and other functional groups that contain heteroatoms such as nitrogen, oxygen, or sulfur. Examples of pigments possessing such groups include oxidized carbon black. A particularly suitable oxidized carbon black pigment is FX™ 200 supplied by Degussa Company (Ridgefield Park, N.J.). Those of ordinary skill in the art know that oxidized carbon black contains carboxyl, hydroxyl, keto, aldehyde, and/or other chargeable groups. Other examples of pigments include Hansa Yellow, Dinitroaniline Orange, Naphthol Red, Red Lake C, Lithol Red, Rubine Red, Dianisidine Blue, Alizarin Lake, and Nickel Azo Yello, which bear hydroxyl groups, and Disperse Yellow 9, Disperse Black 1, and Solvent Brown, which bear amino groups.

The second property desirable in a pigment is its susceptibility or reactivity to permit surface modification. Thus, the pigments should possess surface reactive groups such as, carboxylic groups, hydroxyl groups, amino groups, quinoline groups, thiol groups, epoxy groups, or dioxetane groups.

The polymeric resin used to modify the surface of the pigment preferably should meet two criteria. First, it should have a functional group that can react with the surface anchoring groups of the pigment. Such functional groups include hydroxy, carboxylic acid, carboxy anhydride, thiols, amino, amide, mono or di-substituted amide, isocyanide, isocyanate, and the like.

Second, the polymer should have a hydrophobic portion in its structure capable of being solvated by the non-polar solvent. This portion of the polymeric resin can be of any suitable structure, such as polyalkylenes, polyvinyl halides, polyacrylates, and polystyrenes. Certain specific examples include using polystyrene for being solvated by aromatic solvents (e.g., toluene) and polyethylene for being solvated by aliphatic solvents (e.g., Isopar E or cyclohexane).

Copolymers composed of a reactive polar monomer and a hydrophobic monomer are particularly useful as modifying polymeric resins. Examples of reactive polar monomers include maleic anhydride, acrylic acid, acrylamide, aldehyde containing monomers, amine or amide containing monomers, hydroxyalkyl acrylates, and epoxy containing monomers. Maleic anhydride is a preferred monomer. Examples of hydrophobic monomers include alkenes such as ethylene, propylene, and butylene, substituted alkenes such as styrene, acrylic esters, vinyl ethers, vinyl alkanes, and vinyl halides. Styrene is a preferred hydrophobic monomer.

The copolymers can be blocked, graft, random, statistical, or alternate. Block and graft copolymers are further preferred. Block copolymers can be di, tri, tetra, or multiblock. An example of a suitable block copolymer is polymaleic anhydride-block-polyethylene (Aldrich Chemical Co., Milwaukee, Wis.), which is useful, for example, for modifying and suspending carbon black in paraffinic solvents. The maleic anhydride functionality can react with the surface groups of the carbon black, particularly the hydroxyl groups to form a covalent bond. The polyethylene portion provides suspendability in paraffinic solvents.

Other useful polymers include polystyrene-block-maleic anhydride; graft polymers such as polyethylene-graft-polymaleic anhydride; polycycloalkylethylene-graft-polymaleic anhydride, like polycyclohexylethylene-graft-maleic anhydride; and polymaleic anhydride-graft-polyacrylate, like polymaleic anhydride-graft-polymethylacrylate.

It is particularly preferred that a covalent bond is formed between the reactive groups of the polymer resin and those of the pigment particles. The covalent bond formation can be confirmed by methods known to those of ordinary skill in the art, for example, by infrared spectroscopy. Thus, for example, when a polymeric resin containing a maleic anhydride resin is used to modify the surface of a carbon black pigment, the formation of a covalent bond formation can be confirmed by the appearance of infrared absorption peaks corresponding to the ester carbonyl and carboxyl carbonyl and the disappearance of the carbonyl peaks due to the anhydride groups. Further, the polymer when it is covalently bound to a pigment would not be removed from the pigment by repeated washing with a solvent for the free or unbound polymer. This lack of solubility of the bound polymer can be used as a means for confirming or identifying covalent bond formation.

To provide sufficient steric stabilization for the pigment to be suspended in the solvent, the polymer preferably has a molecular weight from about 15,000 to about 200,000, more desirably from about 15,000 to about 100,000. Even higher molecular weight polymers may be employed; however, the amount of polymer needs to be controlled to avoid processing difficulties due to the high viscosities generally expected of high molecular weight polymers.

The quantity of polymer used would also depend upon factors such as the specific gravity and the surface area of the pigment. Usually the amount of polymer will be from about 1 to about 99 percent, and preferably ranges between about 30 and about 50 percent based on the weight of the pigment.

The surface modification would to alter the density of the pigment. Thus, for example, the density of the modified pigment can be less than that of the pigment itself. This reduction in density is an advantage; it helps in stabilizing suspensions in non-polar solvents by bringing down the density of the pigment close to that of the solvent. Since the density of the surface modifying polymer is generally less than that of heavy or high density pigments, such as titanium dioxide, heavy pigments tend to require more polymer, whereas light pigments, e.g., carbon black, may require a quantity of polymer closer to the low end of this range.

Examples of useful solvents include non-polar, aprotic solvents, such as saturated aliphatic solvents, like Isopar G (Exxon Chemical Co., Houston, Tex.); saturated cyclic aliphatic solvents like decahydronaphthalene and cyclohexane (both from Aldrich Chemical Co.); mixtures of both aliphatic and cyclic aliphatic solvents like VMP Naphtha (Ashland Chemical Co., Chicago, Ill.); aromatic solvents like toluene or xylene (both from Aldrich Chemical Co.); and halogenated hydrocarbons like chloroform and dichloroethane (both from Aldrich Chemical Co.).

The preparation of the non-polar suspensions of the present invention involves the following steps: milling and surface modification. Milling may be performed by any known technique, including using a glass jar charged with glass beads, or a media mill. The usual milling medium of choice is glass beads. For most applications, glass beads of 2 mm diameter are sufficient. If a smaller particle size is desired, zirconium beads with a diameter less than 1 mm can be used. The particle size of the suspended particles can be monitored periodically to determine the desired milling time. Milling can be stopped when no more changes in the particle size occurs. Depending upon the hardness of the pigment, typical milling times range from about one hour to about two hours. The final particle size of the pigment particles is controlled by the size of the milling media and the time of milling. When the milling time is long enough, such as greater than about one hour, enough heat is usually generated to allow the reactive group of the polymeric resin to react with the anchoring group on the pigment surface. If the heat generated during milling is not sufficient to realize the desired amount of reaction, the polymer/pigment mixture can be heated. Heating can be provided by any known heating means.

After the above surface modification step is complete, if desired, the modified pigment particles may be recovered, as by filtration, and washed to separate the pigments particles from the suspension medium. Such modified pigment particles may be used as such or resuspended in another suitable non-polar vehicle.

The stability and chargeability of the pigment suspensions can be determined by any method known to those of ordinary skill in the art. A simple way to study suspension stability is by placing the suspension in a graduate cylinder and observing if a phase separation occurs. If the suspension is not stable, phase separation will occur, forming a supernatant layer which is depleted in pigment and leaving a pigment sediment at the bottom of the container. The volumes or the heights of the supernatant and the sediment can be measured. By this method, one can compare the relative stability of pigment suspensions by (1) observing whether phase separation occurs or not; and (2) comparing the time for the phase separation to happen.

Another method of measuring suspension stability involves the use of an instrument which provides a quantitative measure of the sedimentation rate, e.g., a BYK Chemie Dynometer Type 191 0 (Silver Spring, Md.). This method involves measuring the weight of the sediment phase separating out over a given period of time on a sedimentation disk positioned within the suspension with its concave surface facing upwards. A stable suspension would have a sedimentation rate of less than about 15 mg per hour, preferably close to zero mg per hour.

The chargeability or the ability of the pigment suspension to respond to an external electric field can be determined as follows.

When a pigment suspension in a microtubule is put into a parallel, pulsating electric field, the pigment particles, which are chargeable, will migrate from one end of the electrode to the other. The direction of migration of particles depends upon their net surface charge and the polarities of the electrodes. The synchronized movement of the particles will generate an impression that the whole microtubule is vibrating periodically between the two electrodes. The minimum potential difference, or minimum voltage, across the electrodes needed to cause the particles to migrate would be inversely proportional to the charges induced on or carried by the individual pigment particle. Pigment particles that are highly charged or are easily chargeable would require a lower minimum voltage to migrate. Consequently, when compared among a series of samples, the minimum or threshold voltage to cause such changes will give the relative chargeability or surface charges of the pigment particles.

The minimum voltage can be measured by methods known to those of ordinary skill in the art. Thus, a solution of a non-polar suspension is placed in a microtubule, such as the one available from Viprocom Co. in Mountain Lake, N.J. The microtubule is then placed between two parallel copper electrodes mounted on an acrylic plate. The whole set-up is then placed under a microscope. A pulsating voltage with a square wave form is applied across the electrode and changes in the appearance of the tube are noted. The minimum voltage that causes migration of the particles is also noted. A similar method is described in Y. Hirobe et al., *IS&T's Eighth Int'l Congress on Advances in Non-Impact Printing Technologies*, page 198 (1992).

The present invention will be further described by the following non-limiting illustrative examples.

EXAMPLE 1

This Example illustrates a method of modifying oxidized carbon black using a poly(styrene-co-maleic anhydride) and a method of preparing a non-polar suspension of the modified oxidized carbon black.

0.45 gram of poly(styrene-co-maleic anhydride) (MW 200,000, Aldrich Catalog No. 42694-6) was first dissolved in 48.5 grams of toluene in an 8 ounce glass jar with a screw cap. 1.5 grams of oxidized carbon black (Cabot Corporation, Billerica, Mass.) and 90 grams of glass beads (2 mm diameter) were added to the solution. The container was closed tightly and shaken using a RED DEVIL™ 5400 Paint Mixer (Red Devil Co., Minneapolis, Minn.). The particle size was monitored periodically using a Nicomp Particle Size Analyzer Model 370 (Nicomp, Santa Barbara, Calif.). The milling was stopped when no further change in particle size was observed to obtain a suspension containing the modified pigment. The suspension was suitable to be used as such or suitably diluted with a non-polar solvent to obtain a more dilute suspension.

EXAMPLE 2

This Example illustrates a method of modifying oxidized carbon black using a polyethylene-graft-maleic anhydride polymer and a method of preparing a non-polar suspension of the modified pigment.

The procedure in Example 1 was followed except that a polyethylene-graft-maleic anhydride (Aldrich Catalog No. 44240-2) was used as the modifying polymer. Decahydronaphthalene (Koch Chemical, Corpus Christi, Tex.) was used as the non-polar solvent. A modified pigment and a non-polar suspension were obtained.

EXAMPLE 3

This Example illustrates an advantage of using a high molecular weight polymeric resin to modify oxidized carbon black. Thus, for comparative purposes, modification was carried out using a poly(styrene-co-maleic anhydride) of a molecular weight lower than that of the polymer employed in Example 1.

The procedure of Example 1 was followed but poly (styrene-co-maleic anhydride) of molecular weight 1,900 (Aldrich Catalog No. 42650-4) was employed instead of the polymer of MW 200,000, and a modified pigment was obtained. The sedimentation rate of a non-polar suspension was measured as follows. The amount of the sediment formed was recorded as a function of time using a BYK Chemie Dynometer Type 191 0 (Silver Spring, Md.). The rate was determined by dividing the amount of sediment collected by the elapsed time. The accuracy of measurement is +/−1.0 mg per hour. The sedimentation rates of non-polar suspensions prepared as illustrated in Examples 1 and 3 were measured and the results obtained are set forth in Table 1.

TABLE 1

Sedimentation rates of non-polar suspensions of Examples 1 and 3.

| Example | Molecular weight of polymer | Sedimentation rate (mg/hr) |
|---|---|---|
| Example 1 | 200,000 | 1.5 |
| Example 3 | 1,900 | 72.3 |

The foregoing shows that the higher molecular weight polymer is superior in stabilizing the pigment suspension to the lower molecular weight polymer.

EXAMPLE 4

This Example illustrates the suitability of the modified pigments of the present invention for preparing stable non-polar suspensions in several non-polar solvents.

Non-polar suspensions were prepared using the modified pigment of Example 1 in cyclohexane, toluene, and VMP naphtha. The suspensions contained 3% by weight of carbon black, 0.9% by weight of polymeric resin, and the balance was the non-polar solvent. The sedimentation rates of the suspensions were measured as illustrated in Example 3 and the results obtained are set forth in Table 2.

TABLE 2

Sedimentation rates in various solvents.

| Pigment used | Solvent | Sedimentation rate (mg/hr) |
|---|---|---|
| Carbon Black | Cyclohexane | 0 |
| Carbon Black | Toluene | 1.5 |
| Carbon Black | VMP Naphtha | 3.3 |

The observed sedimentation rates were well below the practical limiting rate for stable suspensions (15 mg/hr). The foregoing shows that the modified pigment of the present invention is suitable for preparing stable non-polar suspensions in several non-polar solvents.

EXAMPLE 5

This Example illustrates a method of evaluating the chargeability of the modified pigments of the present invention.

Two copper strips, each with dimensions of 1 cm×5 cm×0.012 cm, were mounted end to end onto an acrylic plate. The gap between the ends of the strips was about 120 microns. The copper strip ends away from the gap were connected to a power supply with a Model 7500 amplifier (Krohn-hite, Avon, Mass.) and a function generator (Model 95, Wavetek, San Diego, Calif.).

A pigment suspension prepared from the modified carbon black in Example 2 in decahydronaphthalene was placed in a Viprocom microtubule which was later placed in the gap between the copper strips. The whole assembly was then placed on the sample stage of a microscope. The function generator delivered a pulsating electric field across the gap. As the pulse sequence was initiated, any change in appearance of the contents of the microtubule was noted. The voltage was increased slowly until a "vibrating motion" was observed in the microtubule. The minimum voltage needed to effect such a change was recorded. It was observed that the pigment was chargeable as shown the vibrating motion of the contents of the microtubule at the minimum voltage. The experiment was repeated with non-polar suspensions containing the pigment of Example 2 in toluene or VMP naphtha, and the minimum voltage to cause a vibrating motion of the microtubule was noted. The results obtained are set forth in Table 3.

TABLE 3

Minimum voltage required to cause visual changes in the tube containing the pigment suspension

| Pigment used | Solvent | Minimum voltage (V) |
|---|---|---|
| Carbon Black | Decahydronaphthalene | 40 |
| Carbon Black | Toluene | 45 |
| Carbon Black | VMP Naptha | >75 |

The foregoing shows that the modified pigment of the present invention is chargeable. The foregoing further shows that the chargeability of the pigments can be influenced by the suspension medium. The modified pigments were more chargeable in a higher dielectric medium (toluene or decahydronaphthalene) than in a lower dielectric medium (VMP naphtha).

EXAMPLE 6

This Example illustrates another advantage of the surface modification of the present invention. A polymer that forms a covalent bond with a pigment is superior in modifying the pigment and in providing a stable non-polar suspension compared to a polymer that physically adsorbs and does not form a covalent bond with the pigment.

A suspension of oxidized carbon black was prepared as in Example 1 except that the poly(styrene-co-maleic anhydride) was replaced by a commonly used modifier, SOLOSPERSE™ 17940 (Zeneca, Wilmington, Del.). This modifier is believed to be a block copolymer of polymeric fatty ester containing proprietary anchoring groups with one end of the polymer capable of being adsorbed physically onto the pigment and the other end capable of being solvated by the non-polar solvent. The stability of this suspension was compared with that of the non-polar suspension of Example 1. The sedimentation rates were measured and the results obtained are set forth in Table 4.

TABLE 4

Stabilities of the suspensions of Examples 1 and 6

| Suspension | Phase separation observed | Minutes to phase separate | Sedimentation rate (mg/hr) |
|---|---|---|---|
| Example 1 | No | — | 0 |
| Example 6 | Yes | 10 | 1,830 |

The foregoing shows that a pigment modified with a polymer that formed a covalent bond with the pigment forms a more stable suspension compared to a pigment modified by a polymer that physically adsorbs on the polymer.

EXAMPLE 7

This Example illustrates the stability of the modification when a covalent bond is formed between the pigment and the modifying polymer.

A polyethylene-graft-maleic anhydride was used to modify oxidized carbon black as illustrated in Example 2. The modified pigment was separated from the solvent by filtration and the filtered pigment was washed with decahydronaphthalene 16 times. The washed pigment formed a stable suspension in a non-polar solvent, thereby confirming that the polymer was not removed by the washing.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of hydrophobically modifying chargeable pigment particles having a first functional group, said method comprising contacting in a non-polar solvent said pigment particles with a polymer selected from the group consisting of poly(ethylene-co-maleic anhydride), poly(styrene-co-maleic anhydride), poly(cycloalkylethylene-co-maleic anhydride), and poly(maleic anhydride-co-acrylate).

2. The method of claim 1, wherein said contacting is carried out with milling.

3. The method of claim 1, wherein said polymer is poly(ethylene-graft-maleic anhydride).

4. The method of claim 1, wherein the pigment particles comprise oxidized carbon black.

5. Hydrophobically modified chargeable pigment particles prepared by the method of claim 1.

6. A non-polar suspension comprising the hydrophobically modified chargeable pigment particles prepared by the method of claim 1.

7. A method for making a non-polar suspension of chargeable pigment particles comprising: (1) forming a suspension of pigment particles in a non-polar solvent, wherein the pigment particles are inherently ionic or chargeable and possess anchoring groups on the surface of the pigment particles; and (2) contacting the suspension of pigment particles with a polymeric resin comprising a hydrophobic region and polymerized maleic anhydride.

8. The method of claim 7, wherein the pigment particles comprise oxidized carbon black.

9. The method of claim 8, wherein said polymeric resin is a block or graft copolymer of maleic anhydride and a hydrophobic monomer selected from the group consisting of ethylene, methyl acrylate, cycloalkylethylene, and styrene.

10. A non-polar suspension of inherently ionic or chargeable pigment particles having anchoring groups on the surface of said particles comprising said pigment particles suspended in a non-polar solvent, wherein said pigment particles have on their surface a polymeric resin that comprises a hydrophobic region and polymerized maleic anhydride wherein the polymerized maleic anhydride is covalently bonded to the pigment particle surface through reaction with the anchoring groups.

11. The non-polar suspension of claim 10, wherein the pigment particles comprise oxidized carbon black.

12. The non-polar suspension of claim 11, wherein said polymeric resin is a block or graft copolymer of maleic anhydride and a hydrophobic monomer selected from the group consisting of ethylene, methyl acrylate, cycloalkylethylene, and styrene.

13. A method of hydrophobically modifying inherently ionic pigment particles having a first functional group, the method comprising contacting said inherently ionic pigment particles with a polymer having a hydrophobic region and polymerized maleic anhydride so as to form a covalent bond by reaction between the first functional group and the polymerized maleic anhydride.

14. The non-polar suspension of claim 11, wherein the polymeric resin is selected from the group consisting of poly(ethylene-co-maleic anhydride), poly(styrene-co-maleic anhydride), poly(cycloalkylethylene-co-maleic anhydride), and poly(maleic anhydride-co-acrylate).

15. The non-polar suspension of claim 11, wherein the polymeric resin is selected from the group consisting of polymaleic anhydride-block-polyethylene, polystyrene-block-polymaleic anhydride, polyethylene-graft-polymaleic anhydride, polycycloalkylethylene-graft-polymaleic anhydride, and polymaleic anhydride-graft-polyacrylate.

16. The non-polar suspension of claim 11, wherein the polymeric resin is poly(ethylene-co-maleic anhydride).

17. The non-polar suspension of claim 11, wherein the polymeric resin is poly(styrene-co-maleic anhydride).

18. The non-polar suspension of claim 11, wherein the polymeric resin is poly(cycloalkylethylene-co-maleic anhydride).

19. The non-polar suspension of claim 11, wherein the polymeric resin is poly(maleic anhydride-co-acrylate).

20. The non-polar suspension of claim 11, wherein the polymeric resin is polystyrene-block-polymaleic anhydride.

21. The non-polar suspension of claim 11, wherein the polymeric resin is polymaleic anhydride-block-polyethylene.

22. The method of claim 13, wherein the polymer is selected from the group consisting of poly(ethylene-co-maleic anhydride), poly(styrene-co-maleic anhydride), poly(cycloalkylethylene-co-maleic anhydride), and poly(maleic anhydride-co-acrylate).

* * * * *